Patented Mar. 11, 1947

2,417,359

UNITED STATES PATENT OFFICE 2,417,359

CARBON REMOVAL AND REGENERATIVE GAS REQUIREMENTS IN CATALYST REACTIVATION

Jesse A. Guyer, Bartlesville, Okla., assignor to Phillips Petroleum Company, a corporation of Delaware No Drawing. Application November 6, 1943, Serial No. 509,305

2 Claims. (Cl. 252—242)

This invention relates to a unitary catalytic conversion process, and more particularly it relates to a method of control of the regeneration of a conversion catalyst in situ.

In most hydrocarbon conversions wherein the reactions are promoted by catalysts, a time comes when the activity of the catalyst has decreased to a point below which it is uneconomical to continue conversion under the operating conditions most suited for quality and yield of the product. This decrease in catalytic activity is usually caused by deposition of carbonaceous matter upon the surface of the catalyst. In order to reactivate this catalyst, then, the deposited carbonaceous matter must be removed. Earthy catalysts for example, such as bauxite, fuller's earth, etc., and others either naturally occurring or artificial, such as siliceous or aluminous materials, which are resistant to combustion temperatures may be burned free of their carbonaceous matter and so reactivated or regenerated. Some catalysts after being regenerated are fully as active and under some circumstances are even more active than originally. Since combustive reactions are vigorous reactions and frequently evolve large quantities of heat at high temperature, even such catalysts as the above mentioned, must be reactivated with care to prevent overheating. One method for controlling the temperature of this reactivation resides in the use of oxygen in concentrations lower than normal; thus air, the least expensive source of oxygen, may be mixed with such inert gases as carbon dioxide, nitrogen, flue gases, or steam.

Another purpose for mixing inert gases with air for such regenerations is for assistance in dissipation of the heat of combustion of the carbonaceous matter. Since the heat-carrying capacity of gases is not large, the regeneration portion of catalytic cycles is at best time-consuming, and frequently more time is spent on the regeneration portion than on the process portion of the cycle. When such is the case, equipment and operating costs are high, and any improvement which permits lengthening the process step or shortening the regeneration step may be of economic importance.

Thus, an important object of this invention is to provide a method for the reduction in the time required to regenerate catalysts, when such regeneration is carried out by the combustion of carbonaceous matter from catalyst grains.

I have observed that during the regeneration in situ of a catalytic mass wherein the regenerative gases enter, for example, a cylindrical catalyst chamber through one end wall and exit through the opposite end wall, the burning zone moves progressively through the mass of catalyst in the direction of flow of the regenerative gases. The actual combustion or regenerative zone possibly may be better defined as a plane normal to the direction of flow of said gases, but having a finite depth depending at least somewhat on the rate of flow of the regenerative gases and upon the distribution of the regenerative gases with respect to the cross-sectional area of the chamber.

It has been further observed that, as the burning zone approaches a complete traverse of the catalyst bed, free oxygen begins to appear in the effluent gases coincident with a decrease in their temperature. The temperature of the entering regenerative gases is, of course, raised by the heat of combustion of the carbon to some value controlled chiefly by the proportion of inert diluent gas mixed with the oxygen or air.

It is well known that catalytic hydrocarbon conversion reactions are principally surface reactions, and, for this reason, the major portion of the carbon which adversely affects catalytic activity is deposited on the catalyst surface. However, some carbon is deposited within the porous catalyst grains since upon inspection their interior appears black in color. The removal of the surface carbon during the regeneration may be called the primary stage in the reactivation, while the removal of the carbon from the interior of the catalyst grains may be termed the secondary stage.

After the main burning zone has traversed the catalyst mass and the surface carbonaceous material has been substantially removed, the combustion is no longer localized, and there is a subsequent period during which the high temperature attained during the localized combustion, that is, the temperature of the effluent gases, slowly decreases and unconsumed oxygen appears therein. Upon continued passage of the regeneration gases, the temperature of the effluent gases decreases still further while the oxygen content slowly increases. The oxygen content in the chamber effluent approaches that present in the entering regeneration gases as the carbon removal from within the catalyst grains becomes more nearly complete. During this period of secondary regeneration the relatively small amount of combustion taking place is somewhat more uniformly distributed throughout the catalyst mass than is the primary combustion of the surface carbon and this secondary stage in the reactivation has been correlated with the presence of carbon within the catalyst particles themselves. The surface carbon more frequently represents the major portion of the carbon and is consumed entirely during the progress of the localized burning zone through the bed. In contrast, the carbon deposited within the catalyst particles due to their porosity owes its rate of removal to the ability of the regenerative gas to diffuse into the particles. This process of diffusion is a relatively slow one and accounts for the appearance of unconsumed oxygen in the effluent gases during the latter stage of the regeneration as well as for the drop in the effluent temperature.

I have found that it is not necessary to burn out all of the carbon from the interior of the catalyst particles in order that the grains will be fully reactive for promotion of the desired conversion reaction. Since this has been found to be true, I am able, then, to shorten appreciably the regeneration period of catalysts while the process period, when using catalysts so regenerated, has not been shortened. The net result of such an operation is an increase in the "on stream" time, which advantage is reflected in the economics of a given conversion operation both in terms of operating costs and equipment costs for a given plant output.

In the regeneration of a catalyst according to my invention, I prefer to stop the flow of reactivation gases at a selected interval after the appearance of free oxygen in the effluent regeneration gases. The continuation of the reactivation for a short period of time after the oxygen breaks through insures sufficiently nearly complete removal of the carbon or, better, complete removal of the surface carbon, while permitting a desirably small amount of burning out of the carbon from the pores of the catalyst particles. While the percentage of effluent free oxygen marking the preferred extent of the secondary reactivation may vary according to the composition of the entering regenerative gases, and may vary within rather wide limits, I have found that, under normal catalytic conversion conditions, the regeneration may be stopped at a time corresponding to a utilization of the oxygen varying roughly from about 60% to about 90%. By so terminating the regeneration portion of the cycle, considerable saving in regeneration time was made, which saving as mentioned, heretofore, increased the percentage of "on stream" time. In one particular catalytic cracking operation, I have obtained excellent results in increased throughputs per unit volume of catalyst by terminating each regeneration period at such a time as corresponds to approximately 80% oxygen utilization. These above said approximate oxygen utilization limits were determined for use in a steam-air regeneration of 8- to 20-mesh bauxite. The oxygen content of the gases may be conveniently determined by conventional gas analysis or by any other method which may be found convenient and satisfactory for the purpose at hand.

My method for regeneration control has certain advantages over the known method wherein temperatures within the catalyst bed are used as the indicating factor. In this latter method wherein temperatures in various portions of the catalyst bed are recorded during the regeneration period it is known that during the regeneration period there is a marked temperature rise and this rise is then followed by a gradual decline. I have found that in many cases wherein a granular catalyst is used in a vertically disposed catalyst chamber and the regeneration gases are passed downward therethrough, a small volume of catalyst in the bottom center of the bed is not burned free of its surface carbon at the time oxygen breaks through the bottom periphery of the catalyst mass. This central mass of catalyst continues to be regenerated, but very slowly on account of the free flow of regenerating gases through said bottom peripheral region. Thus, the main body of catalyst and the bottom peripheral portion may be fully regenerated previous to the time the surface carbon is removed from the bottom central portion of the catalyst, or, in other words, the main body of catalyst may be "over regenerated" or regenerated a much longer time than necessary by the time this lower central portion of catalyst is in condition for use. I have found that it is not necessary to regenerate fully this said lower "slow to regenerate" portion to obtain satisfactory overall conversion operation. Thus, the temperature of this lower central portion of the catalyst bed, which may not represent more than 1 to 2% of the catalyst volume, will be high and indicative that the catalyst needs further regeneration. While this lower portion of the catalyst is being burned of its carbon, oxygen is passing through the remaining catalyst unconsumed and will show up as such in the regeneration effluent gases.

Relatively long periods of time are required to regenerate completely this said "slow to regenerate" portion of the catalyst and I intend to leave this said very small portion in an unregenerated condition by terminating my regeneration some relatively short time after the oxygen breakthrough, some such time as when 10% to 40% of the oxygen of the regeneration gases passes through as unconsumed oxygen, or at such a time when approximately 60% to 90% of the oxygen is consumed.

It is to be understood that, following the conversion, the catalyst chamber is to be purged with steam or other inert gas previous to passage of the oxygen containing regenerating gas, and similarly, the regenerating gas remaining in the catalyst chamber at the termination of the regeneration is likewise to be purged from the chamber. These said purging steps are old in the art and of conventional practice and therefore are not included within the scope of my invention.

It is obvious to one skilled in the art that with other compositions of regenerative gases, different type catalysts of different particle size, of different porosity, or different space velocities of regenerative gases, the percentage of oxygen consumption for optimum catalyst "on stream" time will vary somewhat from the above given values. Such variations are intended to be within the scope and spirit of my invention.

What I claim is:

1. In the regeneration of a bed of porous granular catalyst deactivated by deposition of carbonaceous material thereon, wherein the major proportion of the carbonaceous material is deposited on the surface of the catalyst and a minor proportion of the carbonaceous material is deposited within the porous catalyst, by flowing through said mass under combustion conditions an oxygen-containing gas, the steps which comprise flowing said oxygen-containing gas through said catalyst bed under combustion conditions until the major proportion of said carbonaceous material is substantially completely burned off in a first regenerative stage and free oxygen begins to appear in the spent regeneration gas leaving the catalyst bed, and continuing the combustion substantially uniformly by continuing the flow of said oxygen-containing gas in a second regenerative stage until the effluent gas contains from 10 to 40 per cent as much oxygen as is present in the gas introduced into the catalyst bed.

2. In the regeneration of a bed of porous granular catalyst deactivated by deposition of carbonaceous material thereon, the major proportion of said carbonaceous material being deposited on the surface of the catalyst and a minor proportion being deposited within the catalyst, by contact with an oxygen-containing gas under combustion conditions, wherein reactivation takes place by the movement of a burning zone progressively through the mass of catalyst, the method of controlling the time and extent of regeneration of the catalyst which comprises flowing through the catalyst bed an oxygen-containing regeneration gas under combustion conditions until the surface carbon is substantially completely removed in a first regenerative stage while substantially completely consuming the oxygen contained in the regeneration gas and until free oxygen begins to appear in the effluent regeneration gas, and continuing the flow of regeneration gas to substantially uniformly burn off a portion of the carbon deposited within the catalyst in a second regenerative stage until the oxygen content of the effluent regeneration gas reaches a concentration which is about 10 to 40 per cent of that of the introduced regeneration gas, whereby optimum regeneration is effected.

JESSE A. GUYER.

REFERENCES CITED

The following references are of record in the file of this patent:

UNITED STATES PATENTS

| Number | Name | Date |
| --- | --- | --- |
| 2,167,655 | Houdry et al. I | Aug. 1, 1939 |
| 2,173,844 | Houdry II | Sept. 26, 1939 |
| 2,185,930 | Simpson et al. I | Jan. 2, 1940 |
| 2,253,486 | Belchetz | Aug. 19, 1941 |
| 2,281,527 | Simpson et al. II | Apr. 28, 1942 |
| 2,329,658 | Simpson et al. III | Sept. 14, 1943 |
| 2,330,767 | Welty | Sept. 28, 1943 |
| 2,344,900 | Reeves et al. | Mar. 21, 1944 |
| 2,353,508 | Schulze | July 11, 1944 |
| 2,357,332 | Kelly et al. | Sept. 5, 1944 |
| 2,361,182 | Eastman et al. | Oct. 24, 1944 |